INVENTORS
HOWARD M. FLEMING, JR.
JOHN F. SCULLY

AGENT

United States Patent Office 2,828,417
Patented Mar. 25, 1958

2,828,417

CLAMPING CIRCUIT MEANS

Howard M. Fleming, Jr., Basking Ridge, and John F. Scully, Glen Garden, N. J., assignors to Monroe Calculating Machine Company, Orange, N. J., a corporation of Delaware Application November 12, 1954, Serial No. 468,463

2 Claims. (Cl. 250—27)

This invention relates to clamp circuits for restricting electrical conductors to selected alternative voltage levels irrespective of the application thereto of voltages of higher and lower magnitudes.

Many complex pulse systems such as those found in electronic computers and the like operate, to a large degree, on electrical pulses of preselected magnitude which rise and fall between predetermined voltage levels. Generally, the individual circuit units of the system are excited to one electrical state by the higher voltage and are maintained in the opposite state by the lower voltage. Where the units comprise vacuum tubes the said one state may constitute conduction while the opposite state constitutes cutoff. In order to propagate the selected voltage levels from unit to unit the output of each unit is clamped to said levels. Frequently clamping of each output conductor is effected by a pair of crystal diodes of which one has its cathode connected to the conductor and its anode connected to a source of the lower voltage, and the other has its anode connected to the conductor and its cathode to a source of the higher voltage. Usually the voltage sources are power-supply busses to which many clamp diodes are wired.

Design considerations make it desirable to select operating voltage levels substantially above ground potential, for example, +90 volts and +60 volts. However, utilization of these voltage levels gives rise to a hazardous condition in that accidental grounding of either of the power-supply busses would create a dangerously large voltage difference between the electrodes of the diodes associated with the bus which could damage the diodes extensively. The magnitude of this hazard is more fully appreciated when it is realized that in large-scale equipment hundreds or thousands of diodes may be connected to each supply bus and that all of them can be "burned out" by accidently grounding the bus with a probe or the like during testing or maintenance of the equipment.

To minimize this hazardous condition extensive protective systems of fuses and the like have been devised. These systems, however, are expensive and are only partially effective.

It has been found that in large-scale equipment, such as electronic computers and the like, there is a statistical distribution of circuit units employing the upper- and the lower-level clamps which does not change substantially during the operation of the equipment. It has further been found, that frequently the statistical distribution approaches a balance, that is, approximately one-half of the circuit units employ the upper-level clamps, while the remainder employ the lower-level clamps. This balance is particularly prevalent in equipment utilizing relatively large numbers of bi-stable flip-flops and other circuits wherein each conducting electronic tube is complemented by a related, non-conducting tube. The invention concerns itself with equipment wherein a said statistical distribution exists.

The principal object of the invention is the provision of novel clamping-circuit means which eliminate the hazardous condition found in the prior-art circuits and, therefore, the need for elaborate protective fuse systems and the like, and yet, which is simpler and less expensive than the prior-art circuits.

According to the invention, the clamping-voltage power supplies are eliminated and the supply busses are connected together by a resistive element of suitable magnitude to produce an IR drop between the busses substantially equal to the desired voltage difference between the two. Both busses are condenser-coupled to ground to integrate the pulsating currents therein and thus to produce an average current condition. Additionally, a resistive element connected to the lower-level bus may be provided to compensate for any deviations from the described balance, being connected either to ground or to a source of higher voltage than the said higher-level voltage, for example, a source of B+, as required.

Other objects and features of the invention will become apparent from the following description when read in the light of the attached drawings of which:

Fig. 1 is a diagram of a typical prior-art clamping arrangement as employed in an electronic computer or the like;

Figure 1:
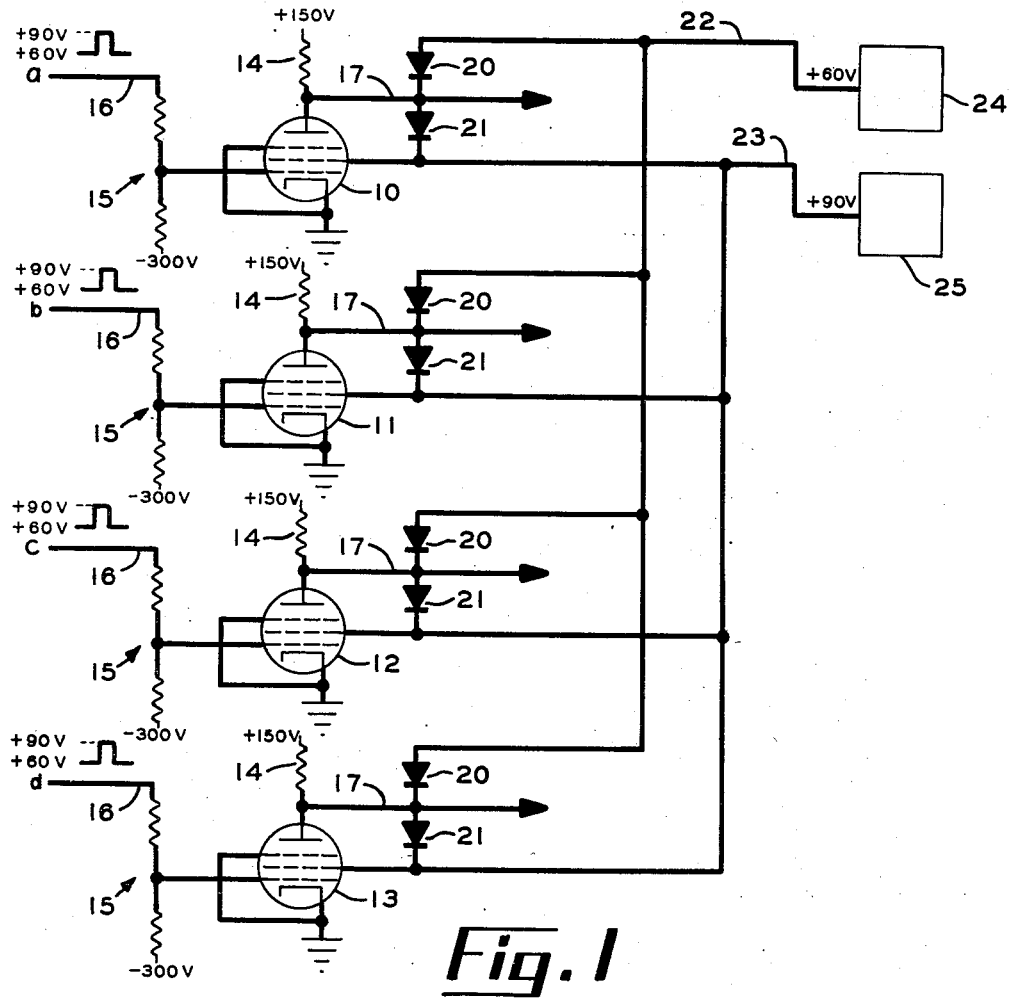

Referring to Fig. 1 there is disclosed a typical prior-art clamping arrangement for the outputs of the circuit units of an electronic computer or the like. The circuit units are exemplified by switch tubes or inverters 10, 11, 12 and 13 controlled differentially by variable input signals $a$, $b$, $c$ and $d$. It will be realized, of course, that an actual computer would embody a large number of circuit units of diversified types rather than just the four units illustrated. Each inverter comprises a pentode having its cathode grounded and its anode connected to a source of B+ voltage through a resistor 14. The suppressor grid of the pentode is connected to the cathode thereof and the screen grid is connected to a source of suitable positive potential as will be described more fully hereinafter. The control grid of the pentode is connected to a voltage divider 15 connected between a source of suitable negative potential and the input line 16 carrying the associated signals $a$, $b$, $c$ or $d$. Divider 15 serves to convert the voltage levels assumed by line 16, for example +60 volts and +90 volts into potentials more suitable for application to the control grid of the pentode to effect cut-off and conduction thereof. An output line 17 is extended from the anode of the pentode.

In order to restrict the potential swings of the output lines 17 to the voltage levels appearing on the input lines 16, namely +90 and +60 volts, each line is connected to the cathode of a diode 20 and the anode of a diode 21. The anodes of the diodes 20 are connected to a common bus 22 and the cathodes of the diodes 21 are connected to a common bus 23. Busses 22 and 23 are, in turn, connected with sources of +60 and +90 volts, respectfully, for example, power supplies 24 and 25.

The arrangement is such that when a pentode 10, 11, 12 or 13 conducts, the potential of its output line 17 drops toward the level of its cathode. However, when the line attempts to fall below the +60 volt level the diode 20 conducts and power supply 24 maintains the same at the +60 volt level. On the other hand, cutting off of the pentode results in a potential rise at its output line toward the B+ voltage level. When this rise attempts to surmount the +90 volt level the diode 21 conducts and power supply 25 maintains the same at +90 volts.

It will be noted that the screen grids of the pentodes may be connected to the +90-volt bus rather than to a separate source of positive potential.

Figure 2:
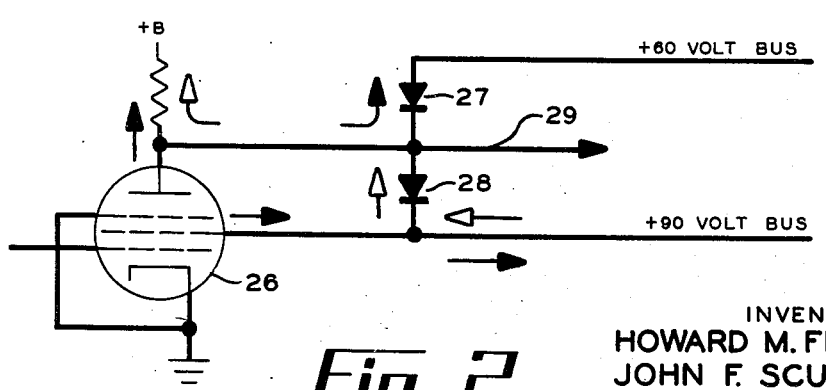
Fig. 2 is a schematic representation of a pentode vacuum-tube stage symbolic of the aggregate of all stages in an equipment for which output-clamping is required.

Referring now to Fig. 2 there is illustrated a pentode 26 having diodes 27 and 28 connecting its output line 28 with +60- and +90-volt busses respectively, the same as described above. Pentode 26 symbolizes all of the circuit units in a piece of equipment, some conducting and the remainder cutoff. Electron current flow in the conducting units is symbolized by arrows having solid heads. Electron current flow in cut-off units is symbolized by arrows having hollow heads. All arrows point in the direction of electron flow.

It will be convenient to consider the electron current flow in cut-off units first. As shown, this flow is from the +90-volt bus through the diode 28 to the output line 29 of the cut-off pentode and thence through the anode resistor for the pentode to the B+ voltage source. When the pentode conducts, however, electron current flows through the tube to its screen grid and to its anode. The electron flow to the anode continues beyond the latter along two paths of which one extends through the anode resistor to the B+ voltage source and the other extends through the diode 27 to the +60-volt bus. The electron flow to the screen grid continues from the latter to the +90-volt bus. Where triodes are utilized instead of pentodes, however, this last electron flow does not exist.

Neglecting for the moment the electron flow through the screen grid, it will readily be seen that electrons flow to the +60-volt bus when the tube is conducting, and flow from the +90-volt bus when the tube is cutoff. Thus the +60-volt supply must be an electron sink while the +90-volt supply must be an electron source. When the electron flow through the screen grid is also considered, it is seen that electrons also flow to the +90-volt bus when the tube conducts. Thus, the +90-volt supply may be either an electron source or a sink depending on whether or not the electron flow from the screen grid over-balances the electron flow from the supply. Generally, the electrons supplied by the screen grid merely reduce the number which the +90-volt source must obtain from other sources.

In a piece of equipment including a very large number of circuit units such as the pentode circuits described above, a balance may exist between conducting and non-conducting units such that the electrons flowing to the +60-volt bus from conducting units will substantially balance the electrons flowing from the +90-volt bus to non-conducting units. In short, the +60-volt bus may provide substantially the same amount of electrons as are required by the +90-volt bus. Under other circumstances, the +60-volt bus may provide more or less electrons than are required by the +90-volt bus. It will be convenient to describe the invention first in connection with a system in which the said balance exists and then to describe the manner in which the invention is applied to systems wherein the balance does not exist.

Figure 3:
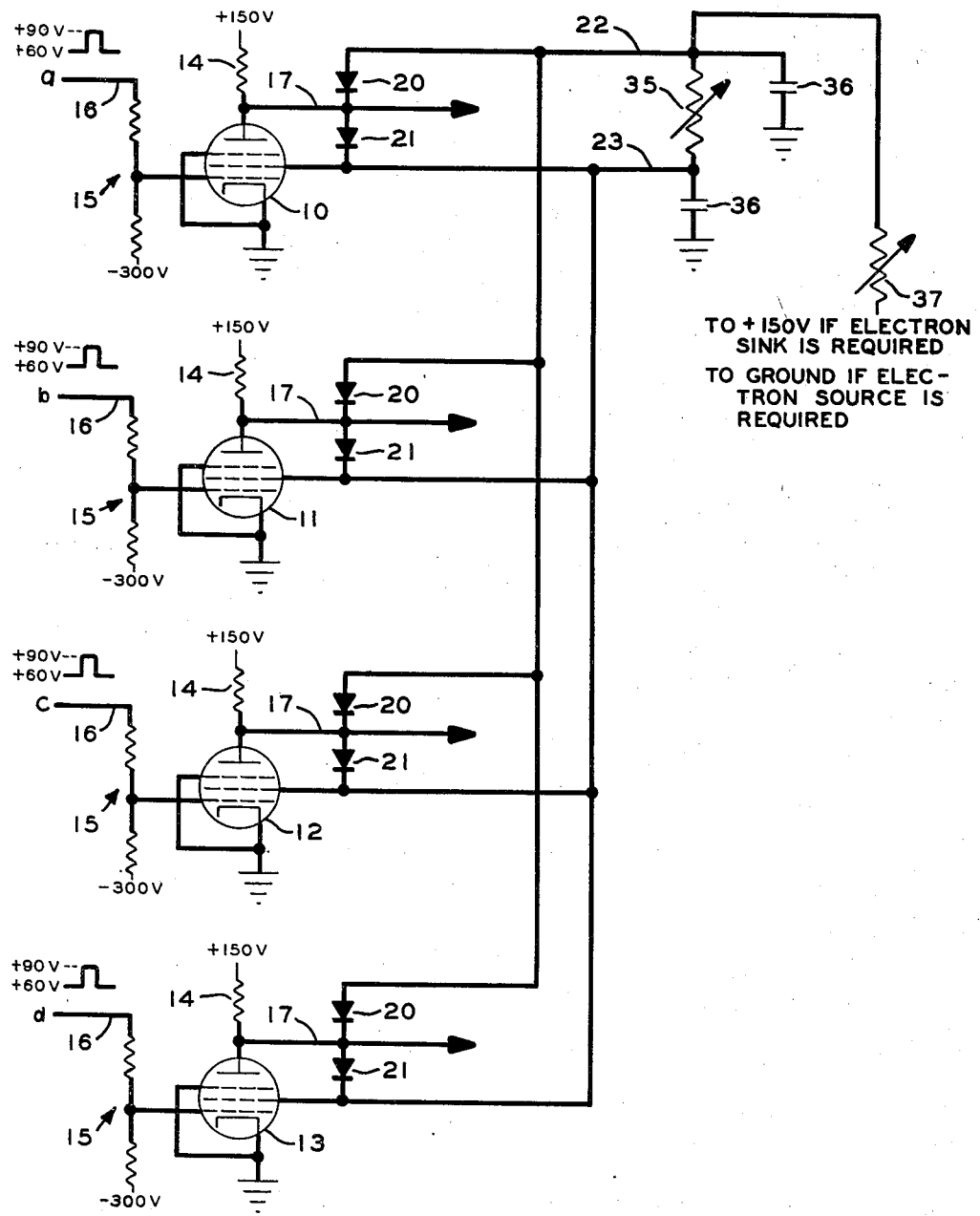
Fig. 3 is the circuit of Fig. 1 modified in accordance with the invention.

According to the invention the clamping-voltage-level power supplies, as typified by the +60- and +90-volt supplies 24 and 25 of Fig. 1, are eliminated as shown in Fig. 3 which, except for this change and the addition of certain components to be described, is identical with Fig. 1. As shown, the +60- and +90-volt busses 22 and 23 are connected together via a resistance 35 which preferably is variable. The magnitude of the resistor 35 is chosen such that the IR drop across it due to electron flow from bus 22 to bus 23, substantially equals the desired voltage difference between the two busses, in the illustrated instance, 30 volts. Both busses are coupled to ground by condensers 36 which serve to integrate the pulsating currents therein and thus to provide average current conditions, that is, the condensers 36 provide each of the busses with substantially constant current levels indicative of the statistical distribution of conducting and non-conducting units. This does not change as individual circuit units become conducting or are cutoff.

It is believed obvious, therefore, that the described arrangement effects proper operation of the clamping circuit when the electrons provided by the +60-volt bus are substantially sufficient to answer the electron requirements of the +90-volt bus. However, where the +90-volt bus requires more or less electrons than are provided by the +60-volt bus source of the additional electrons, or a sink for the excess electrons is required. To this end, the lower-level bus 22 may be connected through a resistor 37 to ground or to a source of more positive potential than the higher-level bus, for example, the B+ voltage source. The actual connection for resistor 37 is made in accordance with the requirements of the particular system. Where the lower-level bus supplies more electrons than are required by the upper-level bus the resistor may be connected to the B+ voltage source which provides a sink for the excess electrons. The magnitude of resistor 37 is, of course, chosen to provide the requisite electron flow in the light of the voltage difference across the resistor. If, however, the opposite condition prevails and the lower-level bus supplies less electrons than are required by the upper-level bus, the resistor may be connected to ground to supply the additional electrons. Preferably the resistor 37 is of the variable variety.

It will be noted that where the resistor 37 is not provided the upper- and lower-level bus "floats." In many types of equipment this floating is not objectionable. In other types of equipment, however, it may be desired to maintain fairly exact voltage levels such, for example, as +90 and +60 volts. This is readily accomplished by adding the resistor 37 even though the described balance exists. Here the resistor 37 should be of relatively large magnitude.

Thus it is seen that the means of the invention provide an economical substitute for the voltage sources normally associated with diode clamping circuits and the like such as are found in electronic computers, and eliminate the possibility that accidental shorting of the voltage busses to ground during test or maintenance operations will damage the diodes. Obviously, the extensive fuse systems used in prior-art devices employing large numbers of diode-clamping circuits are not required.

We claim:

1. A clamp circuit arrangement comprising a plurality of circuits each having outputs to be clamped to both upper and lower voltage levels, a first conductor, a first plurality of diodes each respectively connected with its anode to one of said circuit outputs and its cathode to said first conductor, a second conductor, a second plurality of diodes each respectively connected with its cathode to one of said circuit outputs and its anode to said second conductor and a resistor connecting said first conductor to said second conductor, the IR drop across said resistor determining the difference between the upper and lower voltage levels.

2. A clamp circuit arrangement comprising a plurality of circuits each having outputs to be clamped to both upper and lower voltage levels, a first conductor, a first integrating condenser connected to said first conductor, a first plurality of diodes each respectively connected with its anode to one of said circuit outputs and its cathode to said first conductor, a second conductor, a second integrating condenser connected to said second conductor, a second plurality of diodes each respectively connected with its cathode to one of said circuit outputs and its anode to said second conductor and a resistor connecting said first conductor to said second conductor, the IR drop across said resistor determining the difference between the upper and lower voltage levels.

References Cited in the file of this patent

UNITED STATES PATENTS

| 2,406,978 | Wendt et al. | Sept. 3, 1946 |
| 2,696,557 | Gray | Dec. 7, 1954 |
| 2,731,571 | Chance | Jan. 17, 1956 |

FOREIGN PATENTS

| 427,941 | Great Britain | May 2, 1935 |